No. 647,311. Patented Apr. 10, 1900.
W. T. MAXWELL & G. J. SPAHN.
BORING IMPLEMENT.
(Application filed July 8, 1899.)
(No Model.)
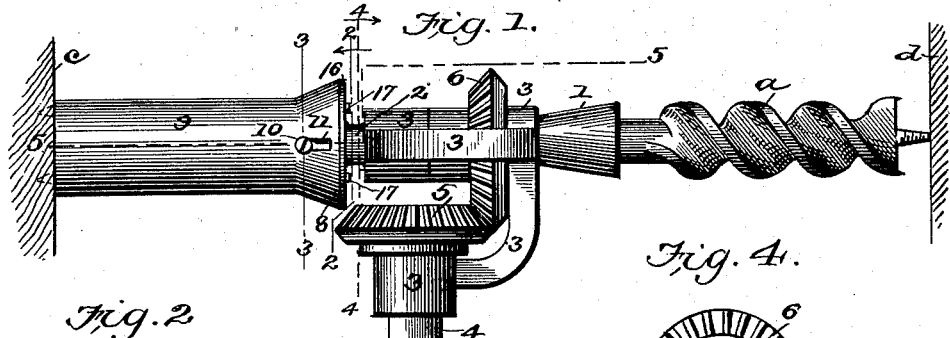
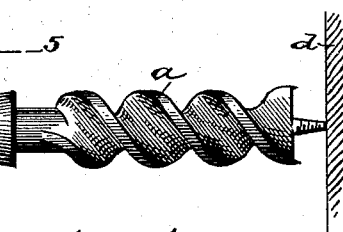
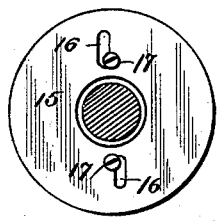
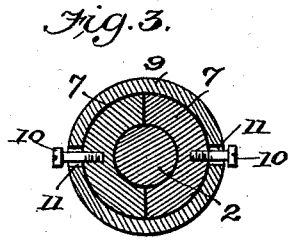
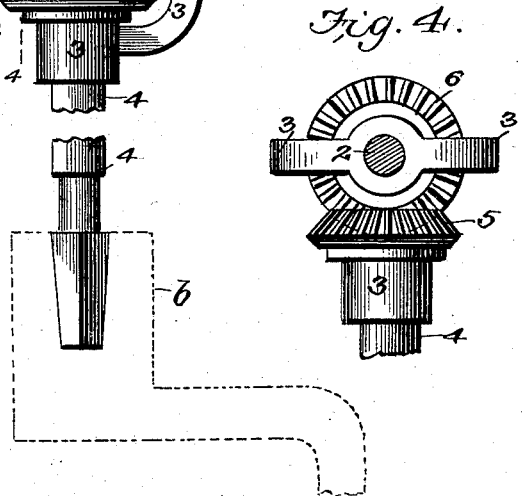
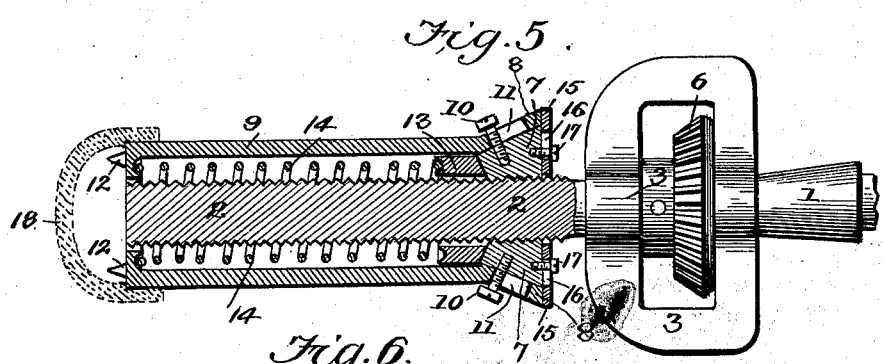
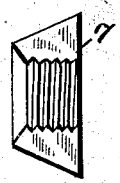
WITNESSES:
Jos. A. Ryan
Amos W. Hart
INVENTORS
William T. Maxwell,
George J. Spahn
By Munn & Co.
ATTORNEYS.

United States Patent Office.

WILLIAM T. MAXWELL AND GEORGE J. SPAHN, OF BALTIMORE, MARYLAND.

BORING IMPLEMENT.

SPECIFICATION forming part of Letters Patent No. 647,311, dated April 10, 1900.

Application filed July 8, 1899. Serial No. 723,185. (No model.)

*To all whom it may concern:*

Be it known that we, WILLIAM T. MAXWELL and GEORGE J. SPAHN, of Baltimore city, in the State of Maryland, have invented a new and Improved Boring Implement, of which the following is a specification.

Our invention is an improved implement for use in boring through joists or in corners or at angles where the ordinary brace or bit cannot be used.

The construction and operation of the invention are hereinafter described and the novel features specifically indicated.

In the accompanying drawings, Figure 1 is a side view of our improved implement. Fig. 2 is a cross-section on line 2 2 of Fig. 1. Fig. 3 is a cross-section on line 3 3 of Fig. 1. Fig. 4 is a cross-section on line 4 4 of Fig. 1. Fig. 5 is in part a plan view and in part a longitudinal section on line 5 5 of Fig. 1. Fig. 6 is an inner side view of one of the halves of the tapered nut forming part of the implement.

A short boring-bit $a$ is held or seated detachably in a socket 1, formed on the end of a rotatable shaft 2, which is journaled in a frame 3 and whose rear portion is screw-threaded. The said frame 3 has bearings for the shaft 2, which are arranged at a right angle to another bearing, wherein is journaled the driving-shaft 4, to which a brace $b$ is applied, as shown in Fig. 1. A bevel-gear 5 is fixed on said shaft 4 and meshes with another, 6, which is keyed upon the threaded feed-shaft 2. It is apparent that by rotating the shaft 4 through the medium of a brace $b$ the shaft 2 and bit $a$ will be rotated in turn. The means for feeding the said shaft and bit are the following: A conical or tapered and truncated nut 7, which is halved or divided centrally and lengthwise, is applied to the threaded part of the shaft 2 and adapted to fit into the correspondingly-tapered end 8 of a tubular back bearing 9 and is held loosely and adjustably therein by means of screws 10, that work in opposite lengthwise slots 11. The said back bearing 9 has points 12 at the opposite end for taking into a joist $c$ or other timber, against which the implement may be set when in use, as shown in Fig. 1. A sleeve or short cylinder 13 surrounds the shaft 2 directly in rear of the nut 7, which it abuts, their meeting ends being chamfered, as shown. A spiral spring 14 (see Fig. 5) encircles the shaft 2 in rear of the sleeve 13, and its rear end rests in a groove formed in the rear end of said back bearing 9.

15 indicates a disk having a milled edge and provided with a central opening to receive the shaft 2 and with oppositely-arranged right-angular slots 16 to receive screws 17, by which the disk is attached to the outer end of the tapered nut 7.

To use the implement, it is supported upon a brace $b$ between two joists $c$ $d$, as shown in Fig. 1, the nut 7 and shaft 2 being adjusted back in the back bearing 9 as far as possible. Then by rotating the brace $b$ the bit $a$ and shaft 2 will obviously be rotated and at like speed, and the shaft 2 will be fed forward so that the bit $a$ will bore into the joist $d$. Suppose the latter to be three inches in thickness and the bit $a$ to have the same length. The bit will obviously bore completely through it and may be drawn out on the other side. To further facilitate this operation, the socket 1 on shaft 2 is made of less diameter than the body of the bit $a$, so that it may enter the bore made by the latter, and thus enable the bit to project from the bore, so as to be more easily accessible for extraction. The bit $a$ having been thus removed, the brace $b$ is rotated in the reverse direction, so as to duly retract the socket 1, whereby the implement is adapted to be removed from between the joists $c$ $d$. The shaft 2 has now been fed forward or advanced, so that its rear end 15 is adjacent to the sleeve 13. By seizing the back bearing 9 and pressing forward with thumb and forefinger upon the screws 10 the force thus applied, supplemented by the expulsive action of spiral spring 14, will suffice to force the nut 7 out of the tapered socket 8 in back bearing 9, and the disk 15 being then rotated the screws 17 will be released from the shoulders at the inner ends of slots 16, which permits the halves of the nut to open outward from each other, so that it and the back bearing 9 may be quickly run up on the shaft 2 and again adjusted, as shown in Figs. 1 and 5, ready for use as before.

The disk 15 serves to hold the parts of the nut connected, and particularly to hold one part or half exactly opposite the other, with their flat ends or faces in the same plane.

When boring in corners or where the implement is not set against a joist, as shown, a cap 18 (see Fig. 5) may be applied to the rear end of the back bearing.

The implement is compact and may be easily operated and quickly readjusted after use. It is particularly useful in boring through joists for introduction of electric light.

Having thus described our invention, what we claim as new, and desire to secure by Letters Patent, is—

1. In a boring implement, the combination of the right-angular frame 3, a threaded bit-carrying shaft and a driving-shaft arranged at a right angle, and meshing gears for rotating them, a tubular back bearing 9, a divided, or two-part, nut in which the threaded shaft works, the same being seated removably in the front end of such back bearing, and as shown and described.

2. In an implement for the use described, the combination with a frame, driving-shaft and threaded bit-carrying shaft, and meshing gears fixed thereon, of a tubular back bearing, having lengthwise slots, a tapered and longitudinally-divided nut adapted to fit into the back bearing, and screws working in the slots and entering the nut, substantially as shown and described.

3. In an implement for the use described, the combination, with a frame, a driving-shaft, a threaded shaft, and meshing gears fixed thereon, of a tubular back bearing having slots as specified, a tapered and divided nut, screws securing the latter largely and adjustably, and a spring encircling the threaded shaft, and pressing forward upon the nut, as and for the purpose specified.

4. In an implement for the use described, the combination with a frame having shaft-bearings at an angle to each other, the driving-shaft and threaded bit-shaft, meshing gears, a back bearing whose longitudinal bore is tapered at the forward end, slots formed adjacently therein, a sleeve arranged in rear of the nut, and a spring encircling the screw-shaft in rear of the sleeve, as shown and described.

5. In an implement for the use described, the combination with the threaded shaft, the back bearing, having a flaring front end, and the tapered nut made in halves, of the disk having slots and screws passing through the latter and entering the respective halves of the nut, as shown and described.

WILLIAM T. MAXWELL.
GEORGE J. SPAHN.

Witnesses:
JNO. P. LEWIS,
JOSEPH RYSANCK.